(12) United States Patent
Childers

(10) Patent No.: US 7,369,730 B2
(45) Date of Patent: May 6, 2008

(54) RANDOM REFRACTIVE INDEX MODULATED OPTICAL FIBERS

(75) Inventor: Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 36 days.

(21) Appl. No.: 11/020,955

(22) Filed: Dec. 23, 2004

(65) Prior Publication Data

US 2006/0140529 A1 Jun. 29, 2006

(51) Int. Cl.
*G02B 6/10* (2006.01)
*G02B 6/00* (2006.01)

(52) U.S. Cl. .......................................... 385/123; 385/12
(58) Field of Classification Search .................. 385/10, 385/12–14, 37, 123
See application file for complete search history.

(56) References Cited

U.S. PATENT DOCUMENTS

| | | | |
|---|---|---|---|
| 4,840,481 A | 6/1989 | Spillman, Jr. | |
| 4,983,034 A | 1/1991 | Spillman, Jr. | |
| 5,178,978 A | 1/1993 | Zanoni et al. | |
| 5,208,136 A | 5/1993 | Zanoni et al. | |
| 5,592,577 A * | 1/1997 | Tanoue | 385/12 |
| 5,798,521 A | 8/1998 | Froggatt | |
| 5,992,181 A * | 11/1999 | Geertman | 65/392 |
| 6,205,265 B1 | 3/2001 | Rozelle et al. | |
| 6,384,915 B1 * | 5/2002 | Everett et al. | 356/336 |
| 6,545,760 B1 * | 4/2003 | Froggatt et al. | 356/477 |

(Continued)

FOREIGN PATENT DOCUMENTS

EP 1553666 A1 7/2005

(Continued)

OTHER PUBLICATIONS

Brooks A. Childers et al., "Recent developments in the application of optical frequency domain reflectometry to distributed Bragg grating sensing", Feb. 2002.

(Continued)

*Primary Examiner*—Brian Healy
*Assistant Examiner*—Charlie Peng
(74) *Attorney, Agent, or Firm*—The H.T. Than Law Group

(57) ABSTRACT

An optical fiber containing one or more random modulations capable of reflecting one or more random wavelengths of light passing through the optical fiber is provided. Each modulation is a section of the optical fiber in which the refractive index has been modified or a section of random refractive index optical fiber that has been spliced into the optical fiber. The optical fiber is produced by modifying the refractive index of at least one portion of the optical fiber through photo-etching, photo-bleaching, ultraviolet radiation exposure or splicing. The optical fiber containing the random modulation is used to measure one or more engineering parameters by locating the section or portion of the optical fiber containing the random modulation in an area where the engineering parameter is to be measured and measuring the engineering parameter using optical frequency domain reflectometry.

17 Claims, 4 Drawing Sheets

U.S. PATENT DOCUMENTS

| | | | |
|---|---|---|---|
| 6,724,469 B2 * | 4/2004 | Leblanc | 356/73.1 |
| 2002/0159139 A1 | 10/2002 | Koplow | |
| 2002/0191912 A1 * | 12/2002 | Robinson et al. | 385/37 |
| 2003/0118297 A1 * | 6/2003 | Dunphy et al. | 385/102 |
| 2004/0141228 A1 | 7/2004 | Keaton | |
| 2004/0208445 A1 | 10/2004 | Mears | |

FOREIGN PATENT DOCUMENTS

| | | |
|---|---|---|
| WO | 03098295 A1 | 11/2003 |

OTHER PUBLICATIONS

W. Eickhoff and R. Ulrich, "Optical frequency domain reflectomerty in single-mode fiber", 39 Applied Physics Letters, 693-695 (No. 9, Nov. 1, 1981).

Mark Frogatt, "Distributed measurement of the complex modulation of a photoinduced Bragg grating in an optical fiber", 35 Applied Optics 5162-5164 (No. 25, Sep. 1, 1996).

Alan D. Kersey et al., "Fiber Granting Sensors", 15 Journal of Lightwave Technology, (No. 8, Aug. 8, 1997).

Search Report for GB0526389.2. Date of Search: Mar. 31, 2006, by Examiner Chris Ross of the Patent Office of Great Britain.

* cited by examiner

RANDOM REFRACTIVE INDEX MODULATED OPTICAL FIBERS

FIELD OF THE INVENTION

The present invention generally relates to optical fibers, and more particularly to monitoring engineering parameters using optical fibers having random modulations.

BACKGROUND OF THE INVENTION

The commercial success of optical fiber telecommunications has fostered the growth of optical fiber sensing applications by providing a ready supply of low cost, high quality components and test equipment. Another enabling characteristic of optical fibers that facilitates their use in fiber sensing is ultraviolet (UV) radiation photosensitivity. This photosensitivity allows the alteration of the internal structure of a fiber waveguide. Modification of the waveguide can be employed for a number of useful purposes. One such useful purpose is to induce a periodic modulation of the refractive index along the fiber core to create a wavelength selective reflector called a fiber Bragg grating (FBG).

A fiber Bragg grating refers to regular, periodically spaced changes in the refractive index made in the core of an optical fiber. These periodic changes reflect a very narrow range of specific wavelengths of light passing through the fiber while transmitting other wavelengths. The period of the change or modulation determines that narrow band of reflected wavelengths. These reflections are small and add together in a phenomenon known as the Bragg reflection, where a single large reflection results from the coherent addition of many small reflections spaced a multiple of half the wavelength apart. The wavelength that is reflected by the fiber Bragg grating can be altered in two ways, altering the temperature or inducing strain in the section of the optical fiber containing the Bragg grating. Therefore, by monitoring the reflected wavelength, Bragg gratings can be used as strain and temperature gauges. In addition, the telecommunications industry has driven their development for use in wavelength division multiplexing, laser transmitter wavelength stabilization, fiber lasers and dispersion compensation.

Other desirable properties of optical fibers include excellent light transmission characteristics over long distances and the ability to fabricate such fibers in lengths of many kilometers. Since the optical fibers can communicate information, for example video, audio, or data, long optical fibers containing one or more fiber Bragg gratings can be used for remote measurement of engineering or environmental parameters. In the petroleum industry, for example, it is important to accurately measure environmental parameters, such as the pressure or temperature being experienced at a certain depth, using an optical fiber, or the strain on that optical fiber at a certain depth. For instance, while drilling, the drill bit may drill into a high pressure layer, and from at least a safety and environmental standpoint it is important to obtain accurate pressure information. Optical fibers can be used to communicate certain environmental and physical parameters from wells being drilled, as well as from already completed wells.

Previous systems using fiber Bragg gratings, however, require a high degree of manufacturing control to produce desired configurations and close correlations between the wavelength response of the fiber Bragg grating and the light source or laser. Therefore, a need remains for optical fibers that can measure engineering parameters and are easier to manufacture and provides a broadband wavelength response.

SUMMARY OF THE INVENTION

The present invention is directed to an optical fiber containing at least one modulation or a plurality of distinct modulations. Each modulation has a random refractive index and is capable of reflecting one or more random wavelengths of light passing through the optical fiber. Each modulation can have the same random refractive index or a different random refractive index. Each modulation can be a section of the optical fiber where the refractive index has been modified or a section of a second random refractive index optical fiber that has been spliced into the first optical fiber. The optical fiber can be disposed in an optical sensor system that includes an optical frequency domain reflectometer.

The present invention is also directed to a method for making the optical fiber by producing at least one modulation having a random refractive index, or a plurality of random modulations, in the optical fiber. The random modulations can be formed by modifying the refractive index of at least one portion of the optical fiber through photo-etching, photo-bleaching, ultraviolet radiation exposure or splicing.

The present invention is also directed to a method for using the optical fiber containing the random modulations to measure one or more engineering parameters. This method includes locating the section or portion of the optical fiber containing the random modulation in an area where the engineering parameter is to be measured and measuring the engineering parameter using optical frequency domain reflectometry.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF PREFERRED EMBODIMENTS

Figure 1:
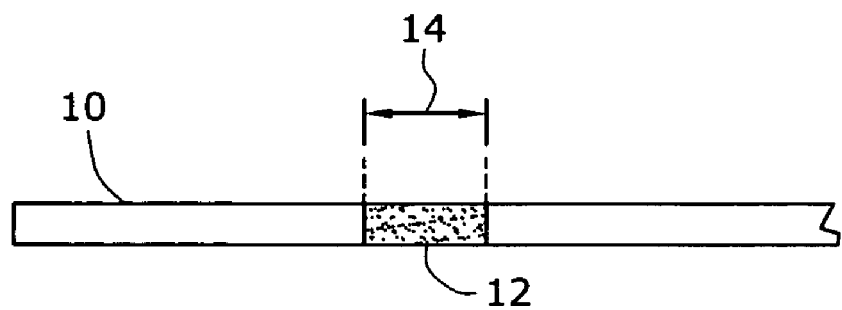
FIG. 1 is a schematic representation of one embodiment of an optical fiber in accordance with the present invention.

Referring initially to FIG. 1, an embodiment of optical fiber 10 in accordance with the present invention is illustrated. Suitable optical fibers 10 include single mode fibers, multimode fibers, multi-core fibers, polarization maintaining fibers, plastic fibers and coreless fibers. In one embodiment, optical fiber 10 contains at least one modulation 12 located in section 14 of optical fiber 10 and having a random refractive index. Modulation 12 has a random refractive index that differs from the refractive index of the bulk or unmodified optical fiber, and modulation 12 is capable of reflecting one or more corresponding wavelengths of light passing through optical fiber 10. As used herein, "random index" or "random refractive index" includes, a single index random value for a given modulation where that particular index value comprises a random variable from a given probability distribution, such as Gaussian, binomial, uniform, etc. Also as used herein, the term "modulation" also includes random refractive index distribution.

Figure 2:
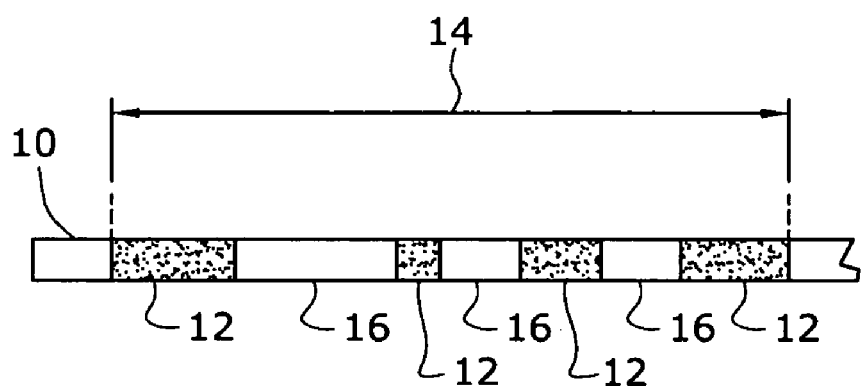
FIG. 2 is a schematic representation of another embodiment of an optical fiber in accordance with the present invention.

In another embodiment as illustrated in FIG. 2, optical fiber 10 contains a plurality of discrete modulations 12 disposed within section 14 of optical fiber 10. Each modulation has a random refractive index that differs from the refractive index of the bulk or unmodified portions of optical fiber 10. Discrete modulations 12 can be distributed throughout section 14, and the length of section 14 can vary from a few inches or centimeters to hundreds or thousands of feet or meters. Discrete modulations 12 are separated by spaces 16 that are substantially free of modulations and have a refractive index substantially the same as the bulk of optical fiber 10. Spaces 16 can be made as small as the spatial resolution of optical fiber 10 will allow and as long as desired to provide for spatial distribution of modulations 12. In one embodiment, spaces 16 are about one to about two inches long.

In one embodiment, each modulation 12 can extend substantially the same length along optical fiber 10. In another embodiment, each modulation 12 extends a different length along optical fiber 10. In one embodiment, each modulation 12 has substantially the same random refractive index. In another embodiment, each modulation 12 has a different random refractive index. In yet another embodiment, the number of unique refractive indices associated with modulations 12 is less than the total number of modulations.

Figure 3:
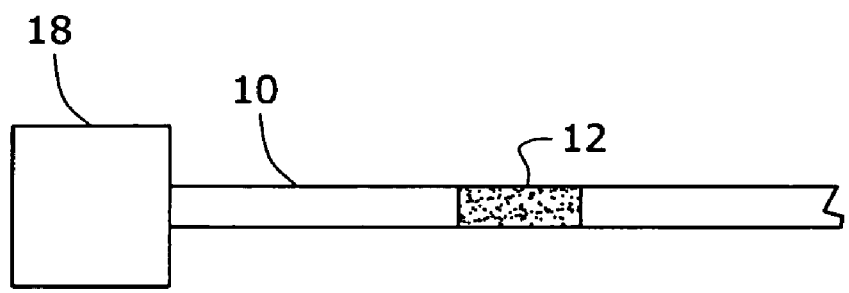
FIG. 3 is a schematic representation of the optical fiber in communication with an optical frequency domain reflectometer.

Optical fiber 10 having one or more modulations 12 can be used in an optical sensor to provide remote, accurate and sensitive measurement of various engineering parameters. These engineering parameters include temperature, strain, pressure and inclination. In one embodiment as illustrated in FIG. 3, optical fiber 10 is placed in communication with an optical frequency domain reflectometer 18. Embodiments of suitable optical frequency domain reflectometers 18 and methods for their operation are discussed below.

Figure 4:
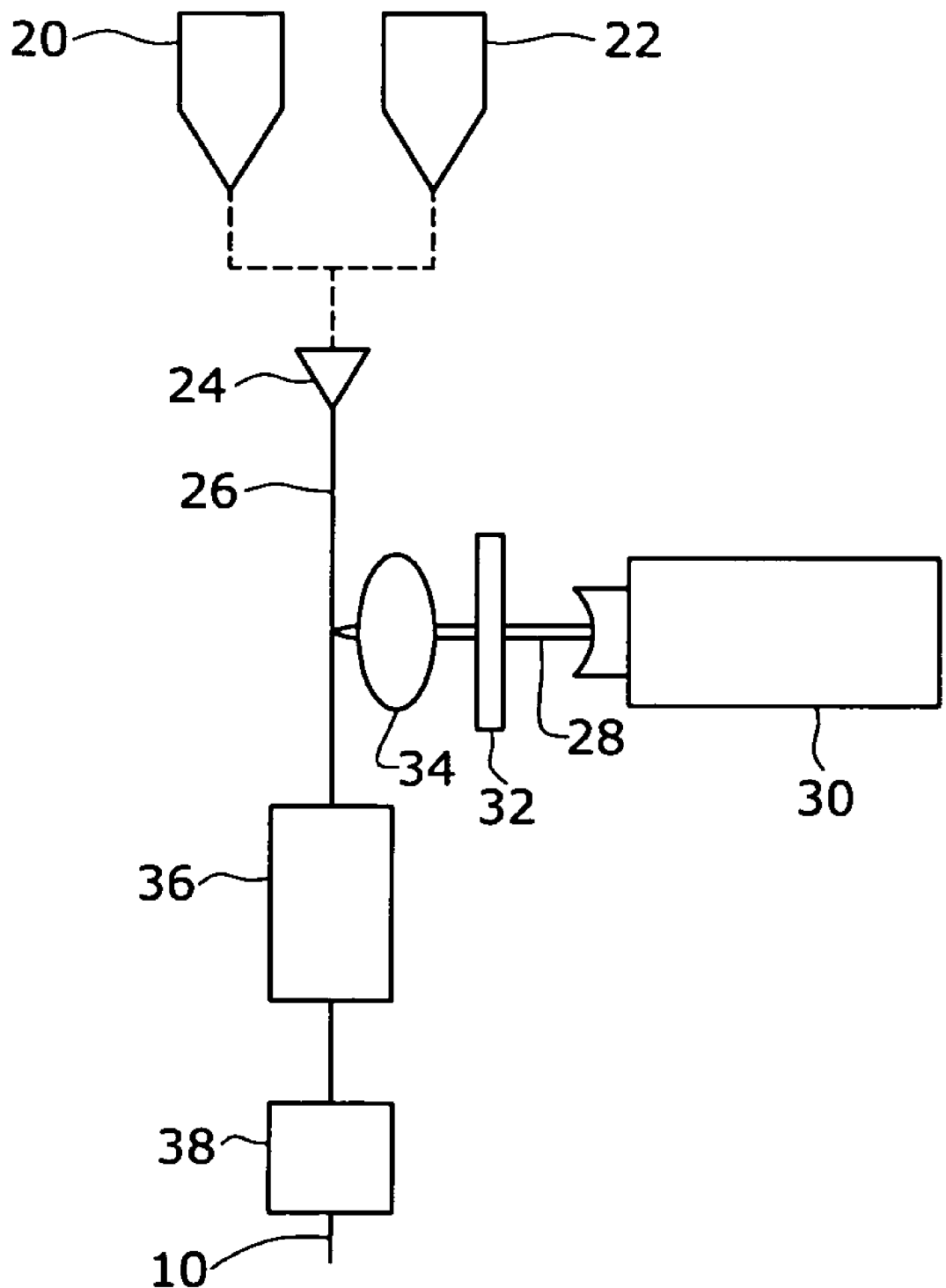
FIG. 4 is a schematic representation of a system for forming an optical fiber in accordance with the present invention.

Referring to FIG. 4, an embodiment of a method for making optical fiber 10 in accordance with the present invention is illustrated. In accordance with this embodiment, one or more modulations 12 are photo-etched or photo-bleached into optical fiber 10. In order to form optical fiber 10, fiber material 20, which can be combined with one or more dopants 22, to form preform 24. Preform 24 can be made by a modified chemical vapor deposition (MCVD) process, where dopants are added to the inner diameter of a glass rod and the rod is collapsed into a perform. Preform 24 contains a core and a cladding section. Any fiber material capable of transporting the desired wavelengths of light can be used. Suitable fiber materials are known and available in the art and include glass ($SiO_2$), polymers and combinations thereof. Dopants 22 are added to increase or decrease the sensitivity of fiber material to various forms of radiation, for example ultraviolet radiation, gamma radiation and x-rays. Suitable dopants 22 include germanium, boron and fluorine, among others. Preform 24 is then heated on a draw tower to melt the preform so that fiber core/cladding 26 can be pulled from the heated end of the preform.

Light 28 from laser 30, for example an ultraviolet laser, is directed toward fiber core/cladding 26 and passed through medium 32. Medium 32 can be any stationary or rotating mask that is capable of imparting a random modulation pattern in light 28, for example as in speckle interferometry. Suitable media 32 include streaky, dirty or pitted optical lenses and containers of dust or particulates. Light 28 is then exposed onto desired section or sections 14 of fiber core/cladding 26 to change the refractive index of fiber core/cladding 26. One or more optional lenses 34 can be used to collimate or focus light 28 when medium 32 is spaced sufficiently far from core/cladding 26. Fiber core/cladding 26 can be continuously exposed to light 28, which can be ultraviolet radiation, throughout the length of section 14 to form a continuous random modulation capable of reflecting one or more wavelengths of light through the fiber. Alternatively, laser 30 can be pulsed or mask 32 can be rotated to form a plurality of discrete, distinct random modulations along the length of section 14. The output of laser 30 and medium 32 can remain constant throughout the etching process or can be varied.

Following modulation etching, coating 36 is applied to fiber core/cladding 26 followed by a jacket. Suitable cladding and jacket materials, and the methods for their application, are available and known in the art. Jacket materials include polyamide, acrylate, silicone, polyurethane and PVC among others. Optical fiber 10 containing the random modulations can then be gathered on a spool or cut to length as desired. Although as illustrated, the modulations are formed in fiber core/cladding 26 before the application of coating and jacket materials, the refractive index of section 14 can be modified after application of either cladding or jacket materials.

In another embodiment of the method in accordance with the present invention, one or more lengths of a second random refractive index optical fiber are spliced into portion 14 of the first optical fiber 10 or fiber core/cladding 26. The second random refractive index optical fiber can be an optical fiber that maximizes backscattering of light. Suitable methods for cutting and splicing optical fiber 10 are available and known in the art. Preferably, the second random refractive index fiber is spliced into optical fiber 10 so as to minimize reflections at the splice joints. Alternatively, the splice joints can be used as a reflector, e.g., a reference reflector. In one embodiment, a single length of the second random refractive index fiber having a length equal to portion 14 is spliced into optical fiber 10. In another embodiment, a plurality of lengths of the second random refractive index fiber separated by lengths of first optical fiber 10 and having a total length equal to the length of portion 14 are spliced into optical fiber 10.

Figure 5:
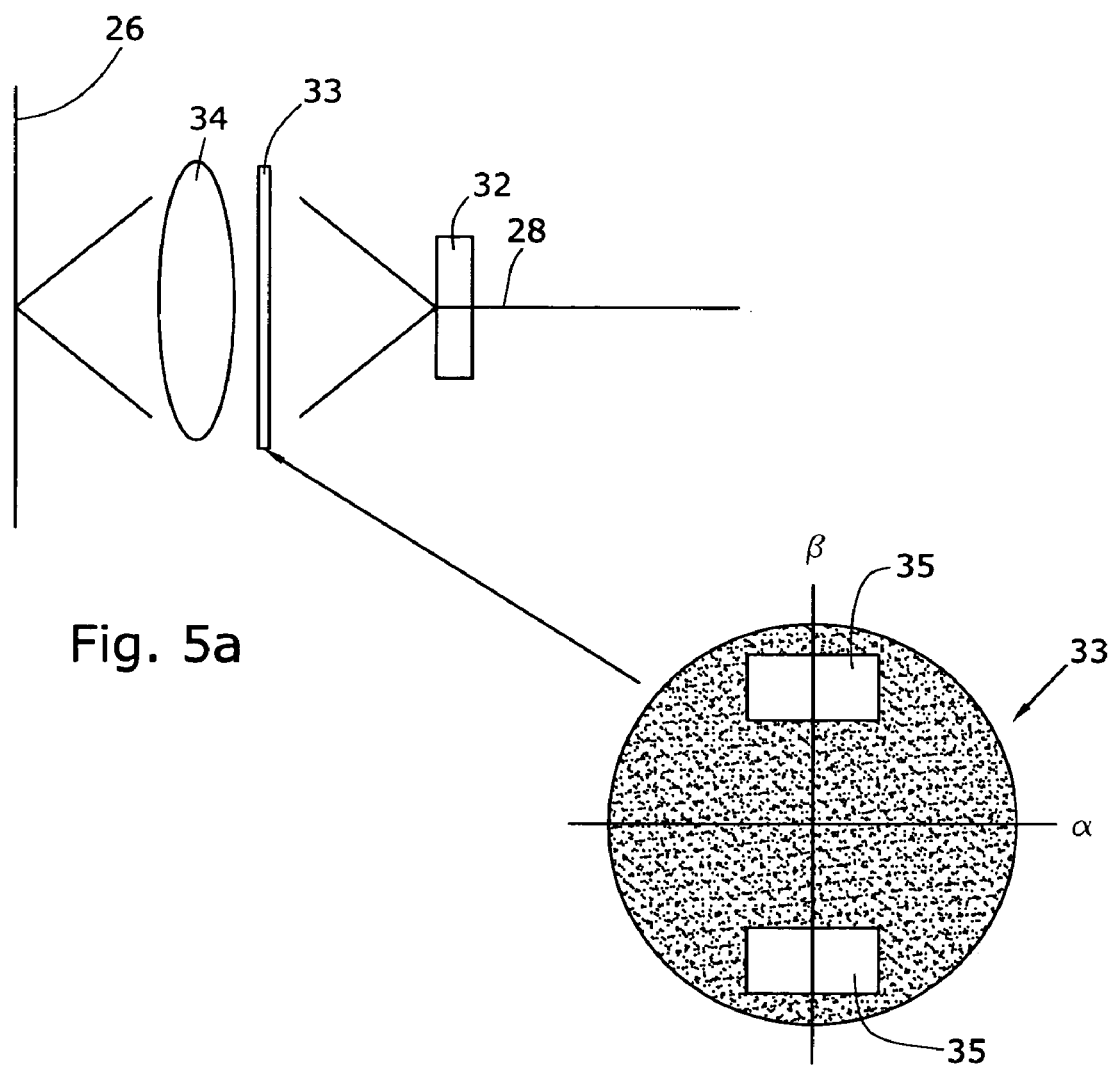
FIG. 5a is a schematic view of the embodiment of FIG. 4 with an optional spatial filter.
FIG. 5b is a plan view of the spatial filter.

Referring to FIGS. 5a and 5b, the system for making optical fiber 10 (shown in FIG. 4) may further have an optional spatial filter 33 used in conjunction with optional lens 34 to improve the dynamic range or efficiency of the photo-etching process. When a lens focuses or collimates light, the curvature of the lens varies the spatial frequency of the random pattern that is etched on to the core/cladding. In other words, the focused light coming from the center of the lens etches a random pattern having a different spatial frequency than another random pattern etched by the focused light coming off the perimeter of the lens or focused light coming off of any other radial location on the lens. Light focused at sections of the lens located at the same radial distance from the center of the lens etches random patterns having substantially the same spatial frequency.

To select or limit the spatial frequency of the random modulation being written on fiber core/cladding 26, spatial filter 33 is provided proximate to lens 34. Spatial filter 33 preferably is larger or the same size as lens 34 and defines at least one hole 35. Light is allowed to pass through hole 35 and other light is blocked by spatial filter 33. Spatial frequency(ies) of the random pattern is controlled by the size and radial distance of hole 35 from center. Focused light passing through hole 35 modulates fiber core/cladding 26. Spatial filter 33 can be located in front of lens 34, as shown, or behind lens 34. Preferably, lens 34 and spatial filter 33 are adjacent to each other. However, other optical elements can be positioned between them, so long that spatial filter 33 limits the range of frequencies focused from lens 34.

Advantageously, the spatial frequency of the random patterns produced by the photoetching process can be used to match the optical frequencies of the light scattered by the random modulation to the frequency of the light source during the measurement process. Hence, wavelength division multiplexing is possible with the embodiments of the present invention.

Figure 6:
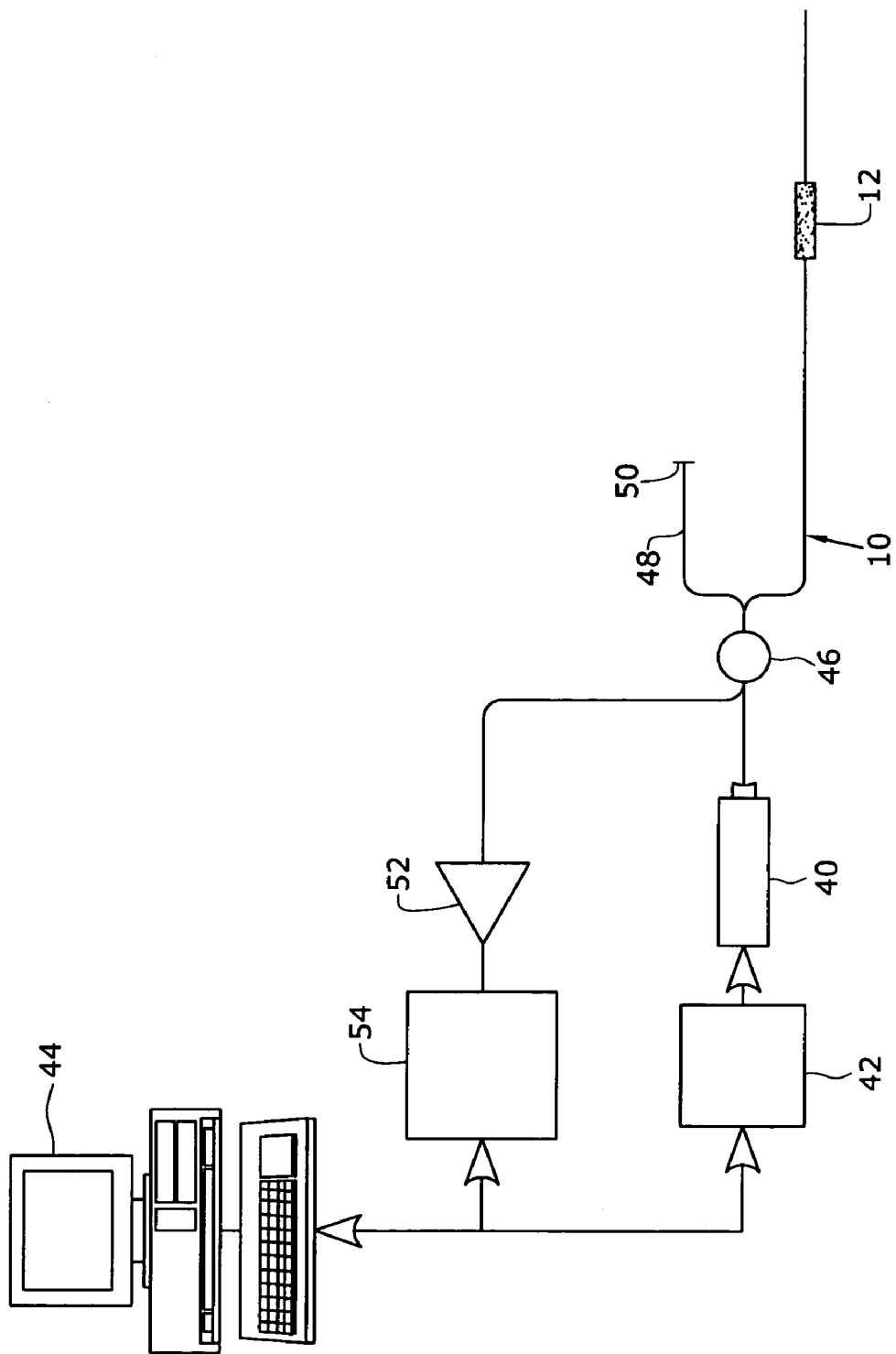
FIG. 6 is a plan view of an optical sensor using the optical fiber in accordance with the present invention.

As illustrated in FIG. 6, optical fiber 10 containing at least one random modulation 12 in accordance with the present invention can be used to measure one or more engineering or environmental parameters including temperature, pressure, strain and inclination. In order to measure the desired engineering parameter, section 14 of optical fiber 10 containing random modulation 12 is disposed or located in an area where the engineering parameter is to be measured. Suitable areas include down hole section(s) of gas or oil wells or on a structural member such as a building support, bridge truss or airplane wing. The engineering parameter can then be measured using suitable methods for detecting changes in random modulation 12 due to the effects of the engineering parameter. Preferably, the engineering parameter is measured using optical frequency domain reflectometry (OFDR) or optical time domain reflectometry (OTDR). A suitable method for using OFDR is described in U.S. Pat. No. 6,545,760. The entire disclosure of this patent is incorporated herein by reference.

In general as illustrated in FIG. 6, tunable laser 40 is provided. Tunable laser 40 is capable of providing a coherent light source across a plurality of wavelengths including the wavelengths of light that are reflected by modulation 12. Preferably, tunable laser 40 has a narrow line width to provide for measurements when modulation 12 is disposed at substantial distances from tunable laser 40. Tunable laser 40 is in communication with and controlled by laser controller 42. Laser controller 42 is in communication with system controller 44.

A beam of light from tunable laser 40 is passed through coupler 46 producing a first portion of the beam of light that is directed through reference optical fiber 48 to reflector 50 to produce a reflected reference beam that is directed back through coupler 46. Typically, this first portion is less than about 10% of the original beam of light. Coupler 46 also produces a second portion of the beam through optical fiber 10 containing modulation 12 to produce a reflected measurement beam corresponding to the wavelength of light reflected by modulation 12. The reflected measurement beam is also directed back through coupler 46.

An interference fringe between the reflected reference beam and the reflected measurement beam is created and detected by photo detector 52 that is in communication with data acquisition circuit 54. Data acquisition circuit 54 is in communication with system controller 44. Suitable system controllers 44 can be any controller capable of controlling laser controller 42 and of collecting and analyzing data received from data acquisition circuit 54, including programmable logic controllers and personal computers. System controller 44 can be in communication with one or more databases (not shown).

The intensities of the interference fringe are converted into analog voltages that are subsequently converted into respective digital representations of the intensities to produce a measured wavenumber domain waveform. The measured wavenumber domain waveform is transformed into a measured spatial domain waveform that is analyzed to select a portion of the waveform corresponding to the modulation section of the optical fiber. Preferably, the measured wavenumber domain waveform is transformed using a fast Fourier transform (FFT).

Once the desired portion of the waveform is identified, that selected portion of the measured spatial domain waveform is converted back into the measured wavelength domain waveform. Preferably, the portion of the measured spatial domain waveform is converted using an inverse Fourier transform. The measured wavelength domain waveform is then cross-correlated with a pre-determined and known reference wavenumber waveform that corresponds to the modulation under a no-load condition. As used herein, a no-load condition corresponds to the modulation before exposure to the engineering parameter to be measured.

Cross-correlation is used to identify a cross-correlation peak between the measured and no-load wavenumber domain waveforms. This cross-correlation peak is used to determine the change in the modulation resulting from exposure to the desired engineering parameter, yielding a value for that engineering parameter.

In one embodiment, laser controller 42 directs tunable laser 40 to produce a beam of light at a wavelength corresponding to the wavelength reflected by modulation 12. Preferably, laser controller 42 sweeps tunable laser 40 through a range of wavelengths, producing a plurality of reflected measurement beams. An interference fringe is created for each one of the reflected measurement beams, and a sample number is assigned to each one of the plurality of reflected measurement beams. The numbered sample corresponding to the modulation 12 is selected and cross-correlated with the no-load wavenumber domain waveform to produce the cross-correlation peak and to determine the value of the engineering parameter corresponding to the cross-correlation peak. Therefore, tunable laser 40 does not have to be selected to correspond to the wavelength of modulation 12, producing the benefit of an optical sensor with a broadband response. In addition to identifying the waveform corresponding to a single modulation, the method of the present invention can be used to identify two or more of the numbered samples corresponding to two or more modulations disposed along the length of optical fiber 10, permitting simultaneous measurement of the engineering parameter at different locations.

In accordance with another aspect of the present invention, the engineering parameters in optical fiber or sensor 10 can be measured by optical time domain reflectometry (OTDR) at each of the reflected frequency, and the responses are added or summed to arrive at the measured results. In general, OTDR is a known process where the propagation delay of optical pulses is measured and is correlated to the engineering parameters of the section being interrogated. Optical coherence domain reflectometry (OCDR) can also be used.

The measurement techniques described above utilizes light scattering or reflecting backward from the modulations through the fiber. As used herein, the term reflecting or reflect includes both reflecting and scattering. Additionally, light transmitted through the modulations also carries information relating to the engineering parameters and therefore can also be used to measure the desired engineering parameters and it is within the scope of the present invention to utilize forward transmitted light to measure engineering parameters.

While it is apparent that the illustrative embodiments of the invention disclosed herein fulfill the objectives stated above, it is appreciated that numerous modifications and other embodiments may be devised by those skilled in the art. For example, optical fiber 10 can be formed without existing modulations and doped to provide sensitivity to certain types of radiation. Optical fiber 10 is then installed over a structure and used to monitor that structure for radiation leaks. As radiation leaks from the structure, the refractive index of optical fiber 10 will change in response to radiation exposure in the location of exposure. The system and methods in accordance with the present invention can then be used to detect the existence of the change in refractive index in optical fiber, providing both an indication of a radiation leak and the location of that leak. Therefore, it will be understood that the appended claims are intended to cover all such modifications and embodiments, which would come within the spirit and scope of the present invention.

What is claimed is:

1. An optical fiber containing at least one random modulation having a random refractive index, wherein the random refractive index is a single index random value for the at least one modulation where the single index random value comprises a random variable from a given probability distribution, and wherein the random modulation is capable of reflecting one or more random wavelengths of light passing through the optical fiber to sense or measure an engineering parameter, and wherein the random modulation is written on to the optical fiber.

2. The optical fiber of claim 1, further comprising a plurality of discrete random modulations each having a random refractive index.

3. The optical fiber of claim 2, wherein each random modulation comprises substantially the same random refractive index.

4. The optical fiber of claim 2, wherein each random modulation comprises a different random refractive index.

5. The optical fiber of claim 2, wherein each random modulation comprises a section of the optical fiber in which the refractive index has been modified.

6. The optical fiber of claim 2, wherein each random modulation comprises a section of random refractive index optical fiber that has been spliced into the optical fiber.

7. The optical fiber of claim 1, wherein the optical fiber is disposed in an optical sensor comprising an optical frequency domain reflectometer in communication with the optical fiber.

8. The optical fiber of claim 1, wherein the optical fiber is disposed in an optical sensor comprising an optical time domain reflectometer in communication with the optical fiber.

9. The optical fiber of claim 1, wherein the optical fiber is disposed in an optical sensor comprising an optical coherence domain reflectometer in communication with the optical fiber.

10. A method for using an optical fiber containing at least one random modulation having a random refractive index written on to the optical fiber, wherein the random refractive index is a single index random value for the at least one modulation where the single index random value comprises a random variable from a given probability distribution, to measure one or more engineering parameters, comprising the steps of:
    (i) locating a section of the optical fiber containing the random modulation in an area where the engineering parameter is to be measured; and
    (ii) measuring the engineering parameter using optical frequency domain reflectometry.

11. The method of claim 10, wherein the step of(ii) further includes cross-correlating a signal containing the engineering parameter to a reference signal.

12. The method of claim of claim 11, wherein the step of (ii) measuring the engineering parameter comprises:
    (a) passing a first portion of a beam of light from a tunable laser through a reference optical fiber to a reflector to produce a reflected reference beam;
    (b) passing a second portion of the beam through the sensor optical fiber containing the modulation to produce a reflected measurement beam;
    (c) creating an interference fringe between the reflected reference beam and the reflected measurement beam;
    (d) convening the intensities of the interference fringe into analog voltages;
    (e) converting the analog voltages into respective digital representations of the intensities to produce a measured wavenumber domain waveform;
    (f) transforming the measured wavenumber domain waveform into a measured spatial domain waveform;
    (g) analyzing the measured spatial domain waveform to select a portion corresponding to the modulation section of the optical fiber;
    (h) converting the selected portion of the measured spatial domain waveform back into the measured wavelength domain waveform;
    (i) cross-correlating the converted measured wavelength domain waveform with a no-load reference wavenumber domain waveform corresponding to the modulation under a no-load condition;
    (j) identifying a cross-correlation peak between the measure and no-load wavenumber domain waveforms; and
    (k) determining the value of the engineering parameter corresponding to the cross-correlation peak.

13. The method of claim 12, wherein the step of (ii.f) transforming the measured wavenumber domain waveform comprises using a fast Fourier transform.

14. The method of claim 12, wherein the step of (ii.h) converting the portion of the measured spatial domain waveform comprises using an inverse Fourier transform.

15. The method of claim 12, further comprising
    (l) sweeping the tunable laser through a range of wavelengths;
    (m) producing a plurality of reflected measurement beams;
    (n) creating an interference fringe for each one of the reflected measurement beams;
    (o) assigning a sample number to each one of the plurality of reflected measurement beams;
    (p) selecting the numbered sample corresponding to the modulations;
    (q) cross-correlating the selected numbered portion with the no-load wavenumber domain waveform to produce the cross-correlation peak; and (r) determining the value of the engineering parameter corresponding to the cross-correlation peak.

16. A method for using an optical fiber containing at least one random modulation having a random refractive index written on to the optical fiber, wherein the random refractive index is a single index random value for the at least one modulation where the single index random value comprises a random variable from a given probability distribution, to measure one or more engineering parameters, comprising the steps of:
   (i) locating a section of the optical fiber containing the random modulation in an area where the engineering parameter is to be measured; and
   (ii) measuring the engineering parameter using optical coherence domain reflectometry.

17. A method for using an optical fiber containing at least one random modulation having a random refractive index written on to the optical fiber, wherein the random refractive index is a single index random value for the at least one modulation where the single index random valve comprises a random variable from a given probability distribution, to measure one or more engineering parameters, comprising the steps of:
   (i) locating a section of the optical fiber containing the random modulation in an area where the engineering parameter is to be measured; and
   (ii) measuring the engineering parameter using optical time domain reflectometry.

* * * * *